(12) United States Patent
Bookbinder et al.

(10) Patent No.: US 11,766,849 B2
(45) Date of Patent: Sep. 26, 2023

(54) METHODS AND APPARATUS FOR FABRICATING AND CUTTING FLEXIBLE GLASS AND POLYMER COMPOSITE STRUCTURES

(71) Applicant: Corning Incorporated, Corning, NY (US)

(72) Inventors: Dana Craig Bookbinder, Corning, NY (US); Patrick Joseph Cimo, Corning, NY (US); Karthik Gopalakrishnan, Corning, NY (US); Timothy Michael Gross, Corning, NY (US); Glafiro Guerrero-Medina, Painted Post, NY (US); Kiat Chyai Kang, Painted Post, NY (US); Sue Camille Lewis, Webster, NY (US)

(73) Assignee: CORNING INCORPORATED, Corning, NY (US)

( * ) Notice: Subject to any disclaimer, the term of this patent is extended or adjusted under 35 U.S.C. 154(b) by 422 days.

(21) Appl. No.: 14/774,469

(22) PCT Filed: Mar. 10, 2014

(86) PCT No.: PCT/US2014/022337
§ 371 (c)(1),
(2) Date: Sep. 10, 2015

(87) PCT Pub. No.: WO2014/159168
PCT Pub. Date: Oct. 2, 2014

(65) Prior Publication Data
US 2016/0023448 A1   Jan. 28, 2016

Related U.S. Application Data

(60) Provisional application No. 61/782,621, filed on Mar. 14, 2013.

(51) Int. Cl.
*C03C 3/078* (2006.01)
*C03B 33/09* (2006.01)
(Continued)

(52) U.S. Cl.
CPC .......... *B32B 17/10* (2013.01); *B32B 17/1099* (2013.01); *B32B 43/003* (2013.01);
(Continued)

(58) Field of Classification Search
CPC ..... C03C 3/078; C03B 33/091; C03B 33/093; B32B 17/1099; B32B 2315/08; B32B 17/064
See application file for complete search history.

(56) References Cited

U.S. PATENT DOCUMENTS 3,089,801 A * 5/1963 Tierney ............. B32B 17/10018
156/1
3,391,053 A * 7/1968 Kolb ..................... C03C 17/322
428/215

(Continued)

FOREIGN PATENT DOCUMENTS

DE   10323303 A1   4/2004
EP    2213632 A1   8/2010
(Continued)

OTHER PUBLICATIONS

English Translation of TW103108703 Search Report dated May 9, 2017.
(Continued)

*Primary Examiner* — Philip C Tucker
*Assistant Examiner* — Christopher C Caillouet

(57) ABSTRACT

Methods and apparatus provide for: sourcing an ultra-thin glass sheet having first and second opposing major surfaces and perimeter edges therebetween, the glass sheet having a thickness between the first and second surfaces of less than
(Continued)

about 400 microns; adhering at least one polymer layer directly or indirectly to at least one of the first and second surfaces of the glass sheet to form a laminated structure; and cutting the laminated structure using at least one of the following techniques: shear cutting, burst cutting, slit cutting, and crush cutting.

13 Claims, 7 Drawing Sheets

(51) Int. Cl.
*B32B 17/10* (2006.01)
*C03B 33/023* (2006.01)
*C03C 3/093* (2006.01)
*C03B 33/07* (2006.01)
*C03C 3/091* (2006.01)
*B32B 43/00* (2006.01)

(52) U.S. Cl.
CPC ........ *C03B 33/0235* (2013.01); *C03B 33/074* (2013.01); *C03C 3/091* (2013.01); *C03C 3/093* (2013.01); *B32B 2315/08* (2013.01)

(56) References Cited

U.S. PATENT DOCUMENTS

| | | | |
|---|---|---|---|
| 6,355,125 B1 | 3/2002 | Tahon et al. | |
| 6,737,606 B2 * | 5/2004 | Peng | B28D 1/221 219/121.68 |
| 6,815,070 B1 * | 11/2004 | Burkle | B32B 3/04 427/165 |
| 6,861,136 B2 | 6/2005 | Verlinden et al. | |
| 8,312,741 B2 * | 11/2012 | Teranishi | B28D 5/0011 65/174 |
| 8,796,165 B2 | 8/2014 | Ellison et al. | |
| 9,469,564 B2 | 10/2016 | Koyama et al. | |
| 2008/0018244 A1 | 1/2008 | Anandan | |
| 2008/0080077 A1 * | 4/2008 | Shih | B29D 11/0074 359/883 |
| 2009/0314032 A1 | 12/2009 | Tomamoto et al. | |
| 2010/0107694 A1 | 5/2010 | Dannoux et al. | |
| 2010/0123219 A1 * | 5/2010 | Chen | H01L 21/78 257/620 |
| 2012/0026573 A1 * | 2/2012 | Collins | B32B 17/10055 359/275 |
| 2012/0131955 A1 | 5/2012 | Kuroiwa et al. | |
| 2012/0301683 A1 | 11/2012 | Li | |
| 2013/0032277 A1 | 2/2013 | Hattori et al. | |

FOREIGN PATENT DOCUMENTS

| | | |
|---|---|---|
| GB | 1319846 | 6/1973 |
| JP | 2011051278 A | 3/2011 |
| JP | 2011093739 A | 5/2011 |
| JP | 2011207721 A | 10/2011 |
| JP | 2012001399 A | 1/2012 |
| JP | 2012087006 A | 5/2012 |
| WO | 2005110741 A1 | 11/2005 |
| WO | 2008093153 A1 | 8/2008 |
| WO | 2012081503 A1 | 6/2012 |
| WO | 2014035942 A1 | 3/2014 |
| WO | 2014107640 A1 | 7/2014 |

OTHER PUBLICATIONS

English Translation of JP2016500943 Office Action dated Dec. 19, 2017, Japan Patent Office, 5 pgs.

* cited by examiner 586.01 um 1608.69 um 83.74 um 379.03 um

FIG. 5A

| Composition (mole %) | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| SiO2 | 67 | 60 | 60 | 60 | 60 | 60 | 60 | 60 | 50 |
| Al2O3 | 11 | 11 | 9.5 | 8 | 6.5 | 5 | 3.5 | 2 | 8 |
| B2O3 | 10 | 18 | 21 | 24 | 27 | 30 | 33 | 36 | 34 |
| CaO | 10 | 11 | 9.5 | 8 | 6.5 | 5 | 3.5 | 2 | 8 |
| MgO | 2 | 0 | 0 | 0 | 0 | 0 | 0 | 0 | 0 |
| SrO | 0 | 0 | 0 | 0 | 0 | 0 | 0 | 0 | 0 |
| BaO | 0 | 0 | 0 | 0 | 0 | 0 | 0 | 0 | 0 |
| ZnO | 0 | 0 | 0 | 0 | 0 | 0 | 0 | 0 | 0 |

FIG. 5B

| Composition (mole %) | Ex.10 | Ex.11 | Ex.12 | Ex.13 | Ex.14 | Ex.15 | Ex.16 | Ex.17 | Ex.18 | Ex.19 |
|---|---|---|---|---|---|---|---|---|---|---|
| SiO2 | 60 | 60 | 70 | 70 | 75 | 60 | 60 | 60 | 60 | 60 |
| Al2O3 | 11 | 11 | 6 | 6 | 3.5 | 9.5 | 8 | 11 | 11 | 11 |
| B2O3 | 18 | 18 | 18 | 18 | 18 | 21 | 24 | 18 | 18 | 18 |
| CaO | 0 | 11 | 0 | 6 | 0 | 9.5 | 8 | 11 | 0 | 0 |
| MgO | 0 | 0 | 0 | 0 | 0 | 0 | 0 | 0 | 0 | 0 |
| SrO | 11 | 0 | 6 | 0 | 3 | 0 | 0 | 0 | 11 | 0 |
| BaO | 0 | 0 | 0 | 0 | 3.5 | 0 | 0 | 0 | 0 | 0 |
| ZnO | 0 | 0 | 0 | 0 | 0 | 0 | 0 | 0 | 0 | 11 |

| Component (mole %) | min | max |
|---|---|---|
| SiO2 | 50 | 80 |
| Al2O3 | 2 | 15 |
| B2O3 | 10 | 36 |
| RO (MgO, CaO, SrO, BaO, ZnO) | 1 | 15 |
| All Other Minor Components | 0 | 5 |

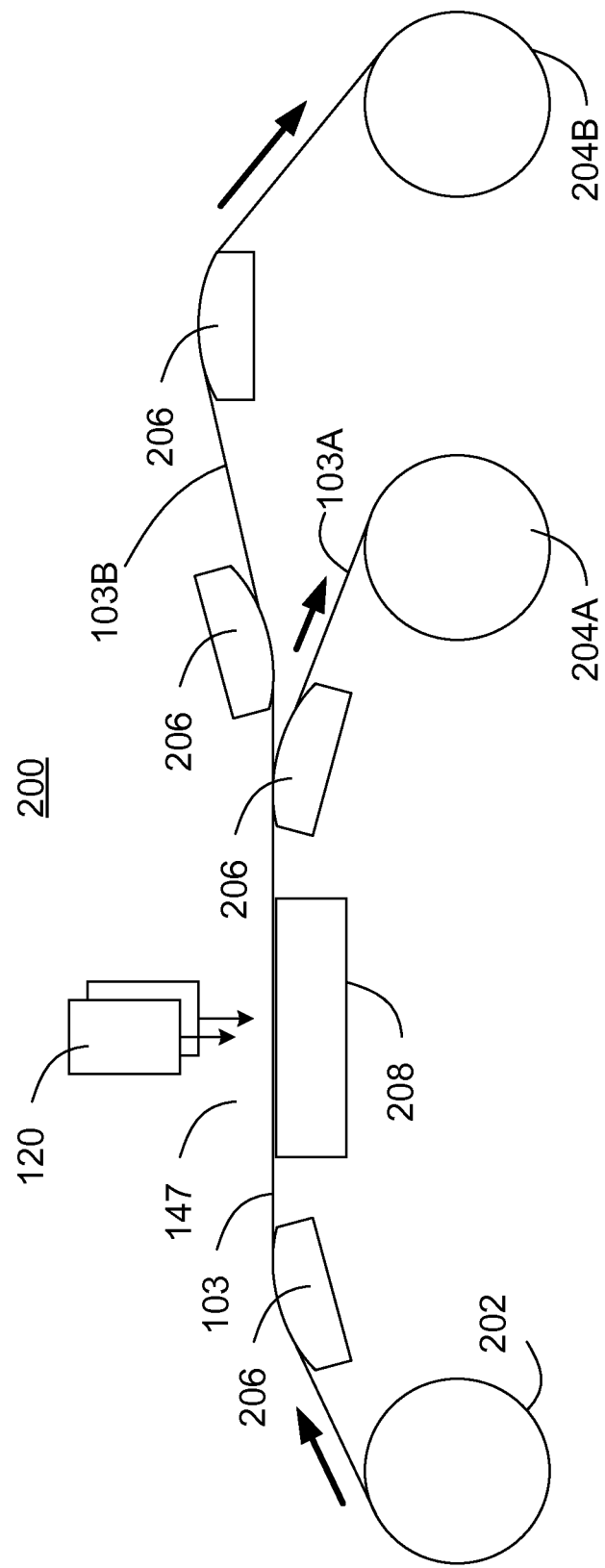

ically in a plane generally perpendicular to the thickness direction) with barrier properties of glass while the ultra-thin glass gains greater flexibility, and bendability
METHODS AND APPARATUS FOR FABRICATING AND CUTTING FLEXIBLE GLASS AND POLYMER COMPOSITE STRUCTURES

CROSS-REFERENCE TO RELATED APPLICATIONS

This application claims the benefit of priority under 35 U.S.C. § 371 of International Patent Application Serial No. PCT/US14/22337, filed on Mar. 10, 2014, which in turn, claims the benefit of priority of U.S. Provisional Patent Application Ser. No. 61/782,621, filed on Mar. 14, 2013, the contents of each of which are relied upon and incorporated herein by reference in their entireties.

BACKGROUND

The present disclosure relates to methods and apparatus for fabricating and cutting flexible glass and polymer laminate structures.

Continuous processing of ultra-thin glass web, such as glass web measuring less than about 0.3 mm, is a relatively new field and presents a number of manufacturing challenges. A conventional process for producing, transporting, and processing such glass web includes employing a roll-to-roll technique in which the glass web is conveyed in a continuous transport between a supply roll and a take-up roll. In order to produce final products, such as glass for barrier, optical film or flat panel displays or other product applications, the glass web must be cut into appropriately sized widths and lengths.

Conventional approaches for cutting ultra-thin glass web, however, dictate that specialized mechanical and/or laser techniques are required in order to achieve desirable edge quality. Indeed, the conventional wisdom in the materials science art is that the thinner the material, the higher the probability of failure in general, and more specifically the higher likelihood, quantity, depth, and overall size of lateral edge cracks when cutting the glass web to size. Stated another way, the conventional wisdom of the skilled artisan in this technology is to either use highly specialized, and costly cutting methodologies to cut the ultra-thin glass web, or to increase the thickness of the glass web to thicknesses above 300 microns in which a traditional mechanical score and break can be used. Neither of the conventional alternatives is particularly desirable if a simpler, faster, and/or lower cost approach were available. Unfortunately, until now no such alternative was available. Accordingly, there has been a need in the art for new methods and apparatus for fabricating and cutting a flexible glass web into various widths and lengths.

SUMMARY

The present disclosure relates to the preparation and processing of ultra-thin glass and polymer composite web into desirable, shapes and sizes, such as different widths during continuous transport and/or different lengths.

For certain applications, it is desirable to employ a glass and polymer composite (or laminate) structure, which combines the various attributes of the materials into a single composite. By laminating the ultra-thin glass with one or more polymer layers, the polymer gains dimensional stability (particularly in a plane generally perpendicular to the thickness direction) with barrier properties of glass while the ultra-thin glass gains greater flexibility, and bendability similar to plastic materials. The increased stability may be in terms of any one or more of creep resistance, reduced elastic and yield elongation, reduced moisture permeability, coefficient of thermal expansion (CTE) of the laminate, or post forming crystallization. The glass and polymer laminate further provides for ease of handling and processing compared to plain ultra-thin glass, whether in sheet form or web form disposed in a roll. Sometimes the term "glass sheet" is used, whereas at other times the term "glass web" is used. However, it should be understood that for the purposes of this disclosure, these terms are used largely interchangeably as the techniques disclosed herein may apply to either sheets or webs of glass material, as a web may be considered a sheet having a length much greater than its width.

In accordance with a particular aspect of one or more embodiments disclosed herein, advantages in cutting the glass and polymer laminate are achieved. For example, in contrast to the conventional wisdom concerning the cutting of ultra-thin glass web (i.e., that undesirable edge characteristics to the possible extent of glass breakage would result from simple mechanical cutting techniques, for example, shear cutting, such as scissor cutting, burst (or razor) cutting, slit cutting, or crush (or score) cutting, such as rotary die cutting, etc.), the embodiments herein employ such cutting techniques whilst achieving acceptable edge quality characteristics (for example, even at temperatures below the softening point of the glass sheet, such as room temperature, and/or at temperatures low enough such that the polymer layer(s) 106 maintains integrity). Moreover, such cutting techniques (which are far less complex and costly than the conventional laser approaches to cutting ultra-thin glass materials) may be applied to the roll-to-roll, continuous process of an ultra-thin glass and polymer laminate in order to produce any number of cost effective commercial products.

It is notable that the conventional wisdom dictates the use of a laser cutting technique to cut an ultra-thin glass web, for example, to remove undesirable features of the web, such as web fusion beads (i.e., the beads that are located at the peripheral edges of the web) during transport. Indeed, since the final product delivered to customers often must exhibit very fine, particle free edges, with minimal edge defects and/or edge corner defects, the conventional thinking is that very complex and costly cutting techniques (like laser cutting) are required.

It has been discovered, however, that the aforementioned very fine edges, with minimal edge defects and/or edge corner defects may be obtained via methods and apparatus, including: sourcing an ultra-thin glass sheet having first and second opposing major surfaces and perimeter edges therebetween, the glass sheet having a thickness between the first and second surfaces of less than about 400 microns; adhering at least one polymer layer directly or indirectly to at least one of the first and second surfaces of the glass sheet to form a laminated structure; and cutting the laminated structure using at least one of the following techniques: shear cutting, such as scissor cutting, burst (or razor) cutting, slit cutting, and/or crush (or score) cutting, such as rotary die cutting.

Advantages and benefits of one or more embodiments herein include any of those detailed below. The embodiments herein may provide an extremely effective barrier exhibiting surface protection for the major surfaces and/or devices of the glass sheet. For example, in photovoltaic applications the glass sheet may act as a hermetic moisture barrier, whilst the laminated structure (polymer-glass-polymer) provides a good barrier layer for thin film photovoltaic (PV), especially building-integrated photovoltaic (BIPV) applications. In addition, the glass can improve the reliability of the PV modules under impact by providing material rigidity during a load impact. Additionally and/or alternatively, the glass sheet may act as a moisture barrier and can also block undesirable ultraviolet light energy (as compared to polymer barrier layers alone). Similar to the thin polymer layer on the glass sheet, the strengthened ultra-thin glass sheet may also be laminated atop the polymer layer to protect the same from deterioration and to protect the inside components from moisture. For example, such a structure may be applied as the encapsulant for an organic light emitting diode (OLED) or array.

The embodiments herein may provide high dimensional stability and rigidity while maintaining flexibility (e.g., bending to about 2 cm radius), increased glass strength, and/or protection. Additionally or alternatively, the embodiments herein may provide high optical clarity in that the polymer layer ensures that the glass sheet remains pristine.

Additionally or alternatively, the embodiments herein may provide for high flexibility for continuous roll-to-roll processes, such as providing a straight forward, low cost method to apply the polymer layer(s) and/or to cut the glass sheet (e.g., shear cutting versus laser cutting) during roll to roll conveyance.

Other aspects, features, and advantages will be apparent to one skilled in the art from the description herein taken in conjunction with the accompanying drawings. For example, the various features may be combined as per the following aspects.

According to a first aspect, there is provided a method, comprising:
sourcing an ultra-thin glass sheet having first and second opposing major surfaces and perimeter edges therebetween, the glass sheet having a thickness between the first and second surfaces of less than about 400 microns;
adhering at least one polymer layer directly or indirectly to at least one of the first and second surfaces of the glass sheet to form a laminated structure; and
cutting the laminated structure using at least one of the following techniques: shear cutting, burst cutting, slit cutting, and crush cutting.

According to a second aspect, there is provided the method of aspect 1, wherein the cutting step produces at least one cut edge having an edge characteristic in which lateral cracks running from the cut edge into the glass sheet penetrate no further than one of: (i) about 1400 microns; (ii) about 1000 microns; (iii) about 800 microns; (iv) about 600 microns; and (v) about 400 microns; (vi) about 200 microns; (vii) about 100 microns, and (viii) about 50 microns.

According to a third aspect, there is provided the method of aspect 1 or aspect 2, wherein a thickness of the at least one polymer layer is one of: (i) between about 1-2 mils; (ii) between about 2-3 mils; (iii) about 3-5 mils; (iv) between about 5-10 mils; and (v) between about 10-20 mils.

According to a fourth aspect, there is provided the method of any one of aspects 1-3, wherein the at least one polymer layer is formed from at least one of: (i) polypropylene (PP) and/or propylene co-polymers; (ii) polyethylene terephthalate (PET); (iii) ethylene vinyl acetate (EVA); (iv) ethylene tetrafluoroethylene (ETFE); (v) cellulose acetate polymers (CA), including cellulose triacetate (TAC); (vi) poly methyl methacrylate (PMMA); (vii) polyethylene and/or polyethylene copolymers (PE); (viii) polyvinylchloride (PVC); (ix) polycarbonate (PC); (x) acrylic polymers (ACRYL); and (xi) nylon polymers.

According to a fifth aspect, there is provided the method of any one of aspects 1-4, wherein the thickness of the glass sheet is one of: (i) less than about 400 microns; (ii) less than about 300 microns; (iii) less than about 200 microns; (iv) less than about 100 microns; (v) less than about 50 microns; (vi) less than about 30 microns; (vii) less than about 20 microns; and (viii) less than about 10 microns (IX) about 2 microns.

According to a sixth aspect, there is provided the method of any one of aspects 1-5, wherein the glass sheet is formed from a composition in mole percent of: 50-80% $SiO_2$, 2-15% $Al_2O_3$, 10-36% $B_2O_3$, 1-15% RO (where RO is one or more of MgO, CaO, SrO, BaO, ZnO), and 0-5% other minor components.

According to a seventh aspect, there is provided the method of any one of aspects 1-6, wherein the adhering step includes lamination of the at least one polymer layer directly to at least one of the first and second surfaces of the glass sheet.

According to an eighth aspect, there is provided the method of aspect 7, wherein the lamination of the at least one polymer layer directly to at least one of the first and second surfaces of the glass sheet is carried out at temperature during one of: an up-draw process, a down-draw process, a fusion process, a redraw process, and a slot-draw process.

According to a ninth aspect, there is provided the method of aspect 1, wherein the adhering step includes laminating the at least one polymer layer indirectly to at least one of the first and second surfaces of the glass sheet through one or more intermediate adhesive layers.

According to a tenth aspect, there is provided the method of any one of aspects 1-9, wherein the adhering step includes laminating the at least one polymer layer to only one of the first and second surfaces of the glass sheet.

According to an eleventh aspect, there is provided the method of any one of aspects 1-9, wherein the adhering step includes laminating a first one or more polymer layers to the first surface of the glass sheet, and laminating a second one or more polymer layers to the second surface of the glass sheet.

According to a twelfth aspect, there is provided the method of any one of aspects 1-9, wherein the adhering step includes laminating one or more polymer layers to at least one of the edges of the glass sheet.

According to a thirteenth aspect, there is provided the method of any one of aspects 1-12, further comprising:
providing a web of the laminated structure;
continuously moving the web to a destination roll in a transport direction along a length of the web; and
continuously cutting the web at one or more cutting zones using one or more of the listed cutting techniques into one or more ribbons as the web is moved to the destination roll.

According to a fourteenth aspect, there is provided the method of aspect 13, wherein the providing step includes:
providing a web of the glass sheet on a source roll;
continuously moving the web from the source roll to a destination roll in a transport direction along a length of the web; and
continuously laminating the at least one polymer layer directly or indirectly to the first and second surfaces of the web as the web moves toward the destination roll.

According to a fifteenth aspect, there is provided the method of any one of aspects 1-14, further comprising, prior to the cutting step, applying a removable backer layer directly or indirectly to at least one of first and second major surfaces of the laminated structure.

According to a sixteenth aspect, there is provided the method of aspect 15, further comprising applying the removable backer layer indirectly to at least one of the first and second major surfaces of the laminated structure through one or more intermediate adhesive layers.

According to a seventeenth aspect, there is provided an apparatus, comprising:

an ultra-thin glass sheet having first and second opposing major surfaces and at least one cut perimeter edge therebetween, the glass sheet having a thickness between the first and second surfaces of less than about 400 microns; and at least one polymer layer adhered directly or indirectly to at least one of the first and second surfaces of the glass sheet, thereby forming a laminated structure, wherein the at least one cut perimeter edge resulting from cutting the laminated structure using at least one of the following techniques: shear cutting, burst cutting, slit cutting, and crush cutting.

According to an eighteenth aspect, there is provided the apparatus of aspect 17, wherein at least one of:

the laminated structure includes at least one polymer layer adhered indirectly to at least one of the first and second surfaces of the glass sheet through one or more intermediate adhesive layers;

the laminated structure includes at least one polymer layer adhered to only one of the first and second surfaces of the glass sheet; and the laminated structure includes a first one or more polymer layers adhered to the first surface of the glass sheet, and a second one or more polymer layers adhered to the second surface of the glass sheet.

According to a nineteenth aspect, there is provided the apparatus of aspect 17 or aspect 18, further comprising at least one of:

a removable backer layer adhered directly or indirectly to at least one of first and second major surfaces of the laminated structure; and a removable backer layer adhered indirectly to at least one of the first and second major surfaces of the laminated structure through one or more intermediate adhesive layers.

According to a twentieth aspect, there is provided the apparatus of any one of aspects 17-19, wherein the apparatus exhibits a water vapor transmission rate of less than 10-6 g·mm/m2·day.

According to a twenty first aspect, there is provided the apparatus of any one of aspects 17-20, wherein the ultra thin glass sheet is dimensioned according to one of: $\geq 1$ cm wide; $\geq 10$ cm wide; $\geq 1$ m wide; $\geq 10$ m wide; $\geq 1$ cm long; $\geq 10$ cm long; $\geq 1$ m long; $\geq 10$ m long; a width of $\geq 0.5$ cm, and a length of $\geq 5$ cm, 10 cm, 1 m, or 10 m; a width of $\geq 5$ cm, and a length of $\geq 5$ cm, 10 cm, 1 m, or 10 m; or a width of $\geq 10$ cm, and a length of $\geq 5$ cm, 10 cm, 1 m, or 10 m.

According to a twenty second aspect, there is provided the apparatus of any one of aspects 17-21, wherein the polymer layer is dimensioned according to one of: $\geq 1$ cm wide; $\geq 10$ cm wide; $\geq 1$ m wide; $\geq 10$ m wide; $\geq 1$ cm long; $\geq 10$ cm long; $\geq 1$ m long; $\geq 10$ m long; a width of $\geq 0.5$ cm, and a length of $\geq 5$ cm, 10 cm, 1 m, or 10 m; a width of $\geq 5$ cm, and a length of $\geq 5$ cm, 10 cm, 1 m, or 10 m; or a width of $\geq 10$ cm, and a length of $\geq 5$ cm, 10 cm, 1 m, or 10 m.

According to a twenty third aspect, there is provided the method of any one of aspects 1-16, wherein the ultra thin glass sheet is dimensioned according to one of: $\geq 1$ cm wide; $\geq 10$ cm wide; $\geq 1$ m wide; $\geq 10$ m wide; $\geq 1$ cm long; $\geq 10$ cm long; $\geq 1$ m long; $\geq 10$ m long; a width of $\geq 0.5$ cm, and a length of $\geq 5$ cm, 10 cm, 1 m, or 10 m; a width of $\geq 5$ cm, and a length of $\geq 5$ cm, 10 cm, 1 m, or 10 m; or a width of $\geq 10$ cm, and a length of $\geq 5$ cm, 10 cm, 1 m, or 10 m.

According to a twenty fourth aspect, there is provided the method of any one of aspects 1-16 or 23, wherein the polymer layer is dimensioned according to one of: $\geq 1$ cm wide; $\geq 10$ cm wide; $\geq 1$ m wide; $\geq 10$ m wide; $\geq 1$ cm long; $\geq 10$ cm long; $\geq 1$ m long; $\geq 10$ m long; a width of $\geq 0.5$ cm, and a length of $\geq 5$ cm, 10 cm, 1 m, or 10 m; a width of $\geq 5$ cm, and a length of $\geq 5$ cm, 10 cm, 1 m, or 10 m; or a width of $\geq 10$ cm, and a length of $\geq 5$ cm, 10 cm, 1 m, or 10 m.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

FIGS. 5A and 5B are tables illustrating the glass compositions employed during experimentation of various laminated structures;

FIG. 9 is a side, elevational schematic view, which illustrates further details of the apparatus of FIG. 8.

DETAILED DESCRIPTION OF THE PREFERRED EMBODIMENTS

Figure 1:
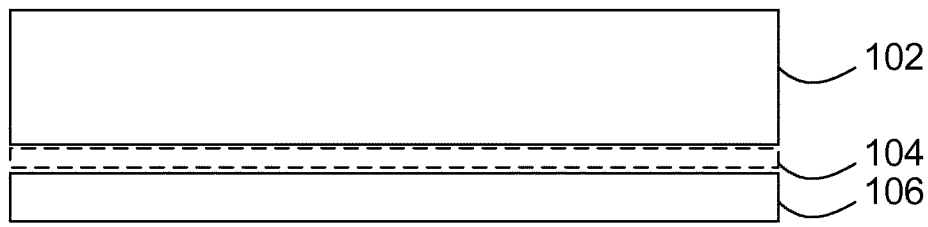
FIG. 1 is a side elevational view of a laminated structure (ultra-thin glass sheet with a polymer layer) in accordance with one or more aspects of the embodiments herein.

With reference to the drawings, wherein like numerals indicate like elements, there is shown in FIG. 1 an apparatus (a laminated or composite structure) 100, including an ultra-thin glass sheet 102 having first and second opposing major surfaces a plurality of perimeter edges therebetween. Notably, the glass sheet 102 is ultra-thin, having a thickness between the first and second surfaces of one of: (i) less than about 400 microns; (ii) less than about 300 microns; (iii) less than about 200 microns; (iv) less than about 100 microns; (v) less than about 50 microns; (vi) less than about 30 microns; (vii) less than about 20 microns; (viii) less than about 10 microns; and (ix) about 2 microns. The glass sheet may have any desired width and length, for example: $\geq 1$ cm wide; $\geq 10$ cm wide; $\geq 1$ m wide; $\geq 10$ m wide; $\geq 1$ cm long; $\geq 10$ cm long; $\geq 1$ m long; $\geq 10$ m long; a width of $\geq 0.5$ cm, and a length of $\geq 5$ cm, 10 cm, 1 m, or 10 m; a width of $\geq 5$ cm, and a length of $\geq 5$ cm, 10 cm, 1 m, or 10 m; or a width of $\geq 10$ cm, and a length of ≥5 cm, 10 cm, 1 m, or 10 m. As discussed above, the conventional wisdom in the art is that such an ultra-thin glass sheet 102 cannot be cut using simple, low cost methodologies (such as shear cutting) because the resultant edge quality would not meet expectations.

In accordance with one or more embodiments herein, however, at least one polymer layer 106 is adhered directly or indirectly to at least one of the first and second surfaces of the glass sheet 102, thereby forming the laminated structure 100. The polymer layer 106 may have the same width and length dimensions as the glass sheet, may be larger, or may be smaller, as desired, whereby any desired amount of overlap between the polymer layer 106 and glass sheet 102 may be obtained. For example, the polymer layer 106 may have any desired width and length, for example: ≥1 cm wide; ≥10 cm wide; ≥1 m wide; ≥10 m wide; ≥1 cm long; ≥10 cm long; ≥1 m long; ≥10 m long; a width of ≥0.5 cm, and a length of ≥5 cm, 10 cm, 1 m, or 10 m; a width of ≥5 cm, and a length of ≥5 cm, 10 cm, 1 m, or 10 m; or a width of ≥10 cm, and a length of ≥5 cm, 10 cm, 1 m, or 10 m. The laminated structure 100 may optionally include one or more intermediate adhesive layers 104 between the glass sheet 102 and the polymer layer(s) 106 when indirect adhesion is desired. If an adhesive layer 104 is employed, then such may be on the order of between about 100 microns-500 microns thick. According to one aspect, the polymer layer is adhered to the portion of the glass sheet 102 wherein it is desired to cut the glass sheet 102.

The laminated structure 100 illustrated in FIG. 1 shows a single polymer layer 106 adhered to the glass sheet 102 via an adhesive layer 104; however, there are a number of variations available to the artisan. For example, the laminated structure 100 may include at least one (or a plurality of) polymer layer(s) 106 adhered directly to one or the other, or both, of the first and second surfaces of the glass sheet 102. Alternatively, the laminated structure 100 may include a first (or a first plurality of) polymer layer(s) 106 adhered to the first surface of the glass sheet 102, and a second (or a second plurality of) polymer layer(s) 106 adhered to the second surface of the glass sheet 102, wherein when a plurality of polymer layers are disposed on one side of the glass sheet 102, they may be disposed one atop another and may be made of the same or a different polymer.

The thickness of the at least one polymer layer 106 is one of (i) between about 1-2 mils; (ii) between about 2-3 mils; (iii) about 3-5 mils; (iv) between about 5-10 mils; and (v) between about 10-20 mils. The at least one polymer layer 106 may be formed from at least one of: (i) polypropylene (PP) and/or propylene co-polymers; (ii) polyethylene terephthalate (PET); (iii) ethylene vinyl acetate (EVA); (iv) ethylene tetrafluoroethylene (ETFE); (v) cellulose acetate polymers (CA), including cellulose triacetate (TAC); (vi) poly methyl methacrylate (PMMA); (vii) polyethylene and/or polyethylene copolymers (PE); (viii) polyvinylchloride (PVC); (ix) polycarbonate (PC); (x) acrylic polymers (ACRYL); and (xi) nylon polymers.

Figure 2:
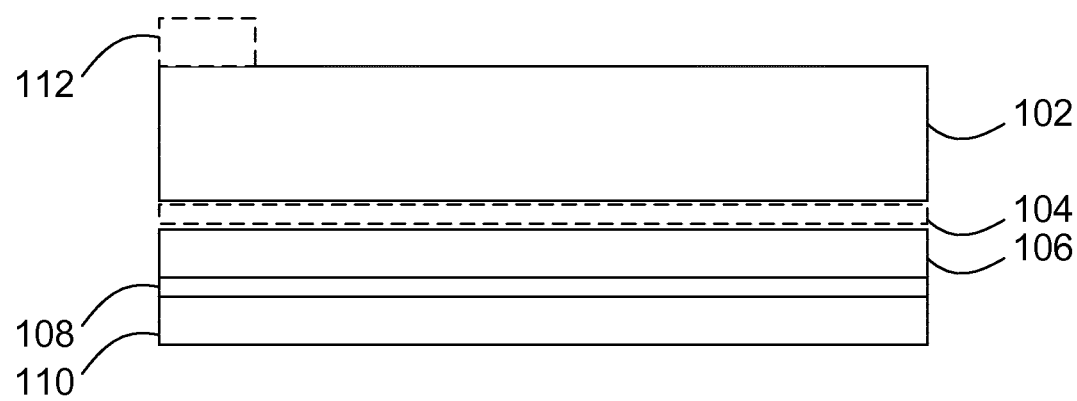
FIG. 2 is a side elevational view of an alternative laminated structure (ultra-thin glass sheet with a polymer layer and removable backer layer) in accordance with one or more aspects of the embodiments herein.

With reference to FIG. 2, a further alternative laminated structure 100A is illustrated. In such embodiment, the structure 100A further includes a removable backer layer 110 adhered directly or indirectly to at least one of first and second major surfaces of the laminated structure 100. For example, the structure 100A may have the removable backer layer 110 adhered indirectly to the laminated structure 100 through one or more intermediate adhesive layers 108. An optional protective layer 112 may be applied to the glass sheet 102 (assuming that there are no further polymer layers 106 on such side of the glass sheet 102). By way of example, the laminated structure 100A may be employed in a "tear away" application, where the backer layer 100 and adhesive layer 108 are torn away to expose the glass sheet 102 and polymer 106 laminated structure 100 for use. For example, one such application is a "tear away" vehicular head light cover that may be easily replaced if/when the head light scratches and/or losses its clarity.

One or more of the edges of the structure 100 and/or the structure 100A may be the result of a cutting process using at least one of the following techniques: shear cutting, burst cutting, razor cutting, crush cutting, score cutting, and rotary die cutting. The properties of the laminated structure 100 are such that the one or more resultant edges from cutting the laminated structure 100 exhibit very fine, particle free characteristics, few defects and/or edge corner defects. Notably, the complex and costly laser cutting technique need not be employed to cut the laminated structure 100, 100A. The desired edge characteristics are such that any lateral cracks resulting from the cutting operation and running from the cut edge into the glass sheet 102 penetrate no further than: (i) about 1400 microns; (ii) about 1000 microns; (iii) about 800 microns; (iv) about 600 microns; (v) about 400 microns; (vi) about 200 microns; (vii) about 100 microns, and (viii) about 50 microns.

A number of laminated structure samples were prepared in the laboratory, specifically, a number of 15 cm×15 cm glass sheets 102 were laminated with polymer films 106. The glass sheets 102 were formed from flexible glass available of varying thicknesses, such as 100 microns, 50 microns, 35 microns, 25 microns, and 10 microns. The polymer layers 106 were formed from polyethylene terephthalate (PET) of various thicknesses, including 3 mils, 5 mils, and 10 mils.

The samples were cut with a number of different cutting mechanisms, including shear-type cutting mechanisms, hand scissors, guillotine and rotary trimmers, shear slitters, crush cutters, and rotary die cutters.

Figure 3A:
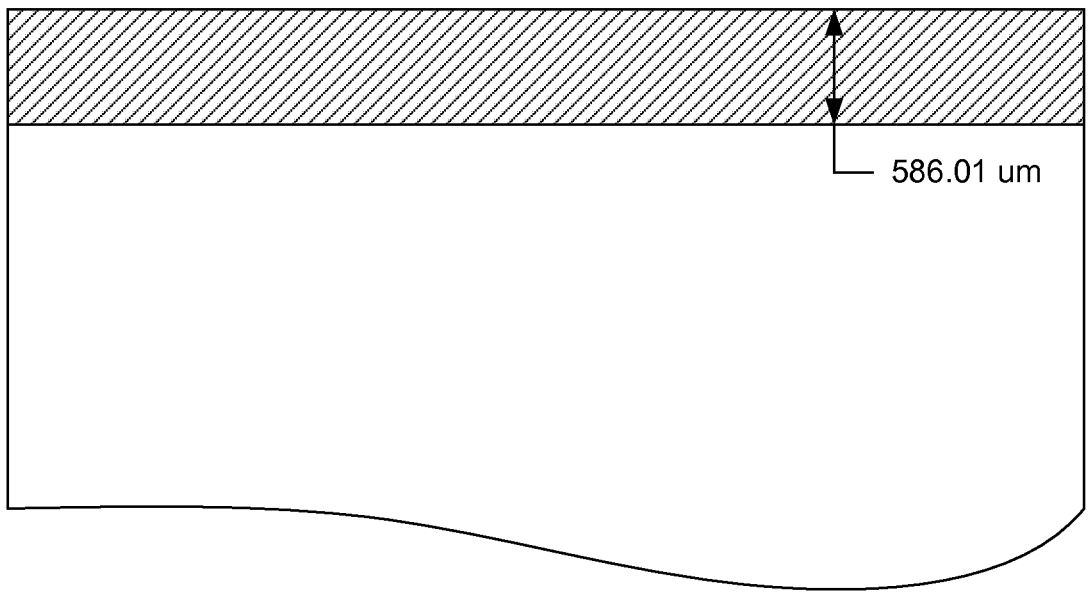
FIGS. 3A and 3B show highly magnified photographs of the cut edge characteristics (via shear cutting) of the laminated structure (FIG. 3A) as compared to the cut edge characteristics of the plain ultra-thin glass sheet (FIG. 3B)
Figure 3B:
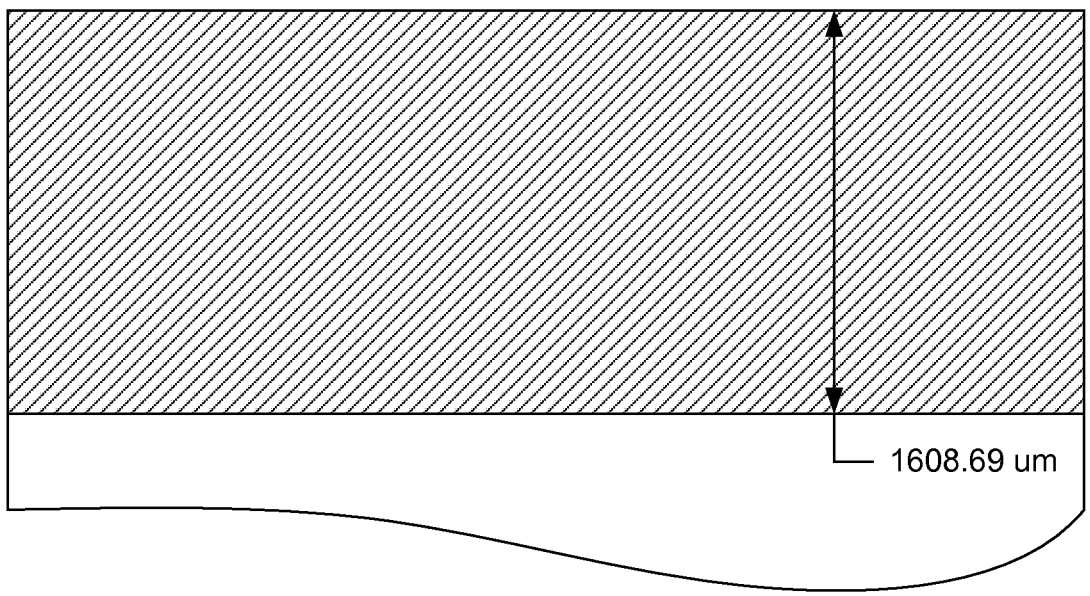

Reference is now made to FIGS. 3A-3B, which are top views looking down onto a major plane of respective glass sheets 102, with a cut edge running horizontally along the top of the figure, and the thickness of the glass sheets 102 extending in a direction perpendicular to the plane of the figures. The hatch lines in FIGS. 3A-3B represent the depth of the lateral cracks into the glass sheets 102. The shear cutting with scissor-type cutting mechanisms produced a very high quality cut edge in FIG. 3A, specifically where the lateral cracks resulting from the cutting operation and running from the cut edge into the glass sheet 102 penetrated no further than about 586 microns. In comparison, FIG. 3B shows that the same cutting technique carried out on a glass sheet 102 with no polymer layer yields lateral cracks running from the cut edge and penetrating into the glass sheet 102 by about 1600 microns. In some experiments, the samples without the polymer layer 106 resulted in the glass sheet 102 cracking and falling apart into many pieces when shear cutting was attempted.

Figure 4A:
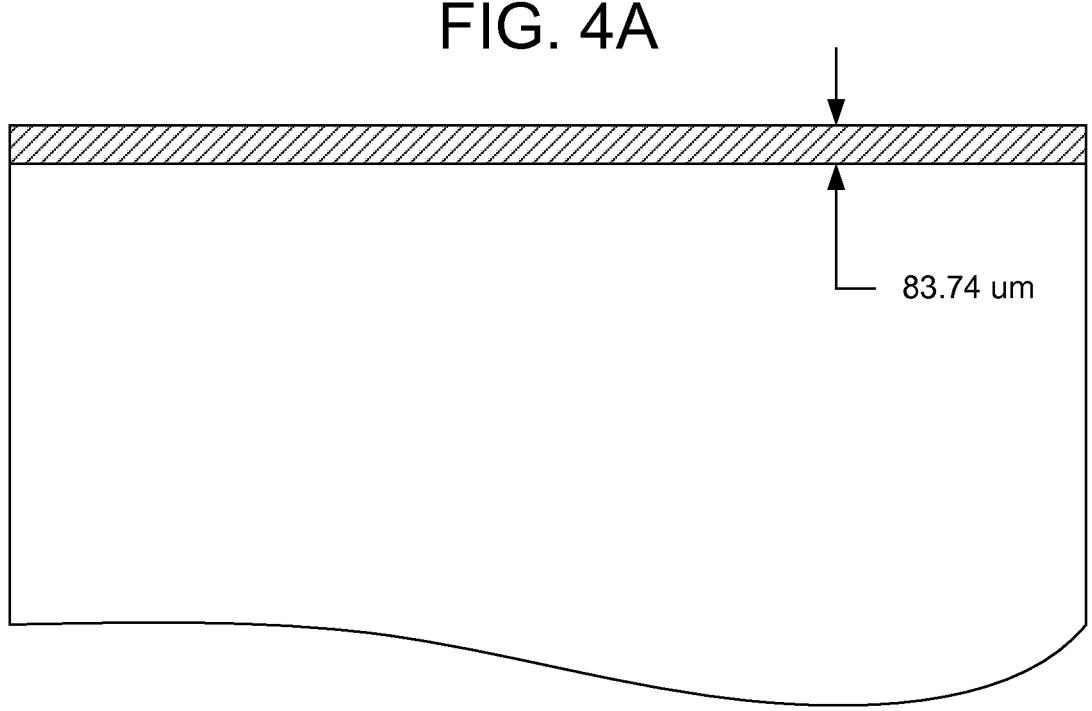
FIGS. 4A and 4B show highly magnified photographs of the cut edge characteristics (via die cutting) of laminated structures of differing thicknesses.
Figure 4B:
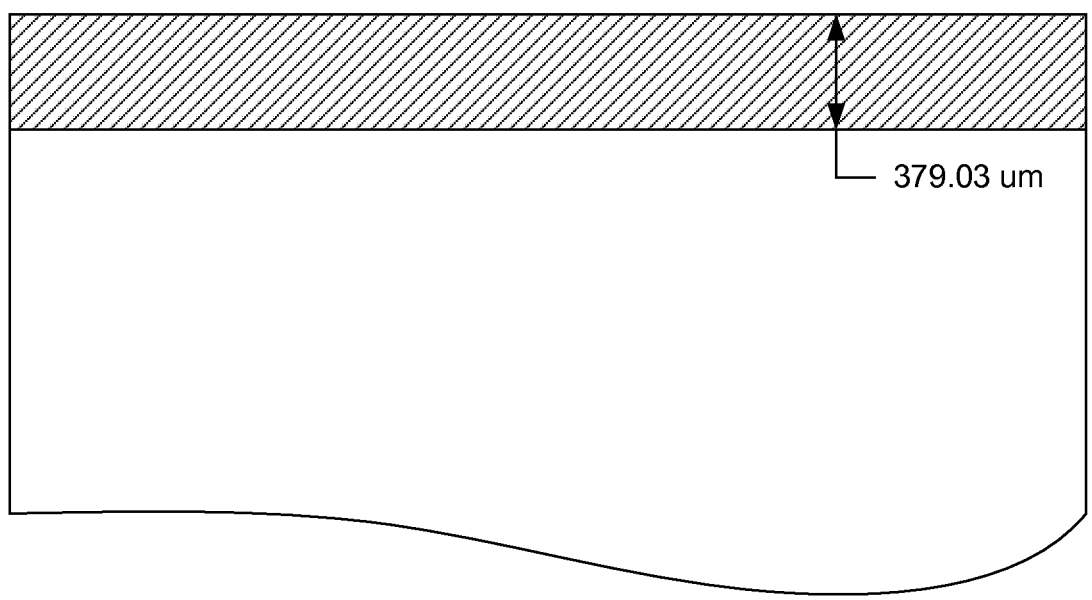

With reference to FIGS. 4A and 4B, the rotary die cutting mechanism also produced a very high quality cut edges. Again, FIGS. 4A-4B are top views looking down onto a major plane of respective glass sheets 102, with a cut edge running horizontally along the top of the figure, and the thickness of the glass sheets 102 extending in a direction perpendicular to the plane of the figures. The hatch lines in FIGS. 4A-4B represent the depth of the lateral cracks into the glass sheets 102. A number of samples of varying thickness, including 100 microns, 50 microns, 25 microns, and 10 microns, each with a 3 mil (PET-heat sealable PET obtained from Staples as Staples Brand Heat Seal Lamination Film) polymer layer 106 (bonded to the glass to form the glass-polymer laminate) were cut using a rotary die cutter. The laminated samples were approximately 20 cm×20 cm (length×width). FIG. 4A shows that a 10 microns thick sample exhibited edge characteristics in which the lateral cracks resulting from the cutting operation and running from the cut edge into the glass sheet 102 penetrated no further than about 84 microns. FIG. 4B shows that a 100 microns thick sample exhibited edge characteristics in which the lateral cracks resulting from the cutting operation and running from the cut edge into the glass sheet 102 penetrated no further than about 380 microns. The surface analysis of all of the samples indicated that there was a significant difference in the extent of surface and lateral cracking along the edges depending on the thickness of the glass sheet 102, whereby the thinner 10 microns sample exhibited fewer and smaller lateral cracks in comparison to the thicker samples.

Employing the polymer layer(s) 106 to the glass sheet 102 provides some additional features to the laminated structure 100 beyond the improvement to the cut edge characteristics discussed above. For example, the proper selection of the materials from which the glass sheet 102 and the polymer layer(s) 106 are formed may provide very desirable water vapor transmission rates (WVTR). WVTR is the measurement of the hermeticity or impermeability of a barrier film to water vapor. The ultra-thin glass and polymer structure 100 offers similar impermeability as that of glass, well above commercially available plastic film barriers alone. In fact, glass is known to be the perfect barrier and exceed current measurement capabilities. From the applicable literature, glass WVTR has been quoted to be less than about 10-6 g·mm/m²·day. Available measurement results indicate glass actually exhibits about 6×10-6 g·mm/m²·day; however, such a value is actually due to the limitations of available measurement equipment, not the actual vapor barrier characteristics of glass. The glass and polymer laminate structure 100 herein will have a WVTR similar to the value for glass. In comparison, commercially available polymer barrier films alone exhibit much higher WVTR, such as 0.39-0.51 g·mm/m²·day for PET; 3.82-4.33 g·mm/m²·day for polycarbonate; and 15-16 g·mm/m²·day for Nylon 6.

Also, by laminating the ultra-thin glass 102 with one or more polymer layers 106, the polymer gains dimensional stability (particularly in a plane generally perpendicular to the thickness direction) with barrier properties of glass while the ultra-thin glass gains greater flexibility, and bendability similar to plastic materials. The increased stability may be in terms of any one or more of creep resistance, reduced elastic and yield elongation, reduced moisture permeability, coefficient of thermal expansion (CTE) of the laminate, or post forming crystallization. The glass and polymer laminate further provides for ease of handling and processing compared to plain ultra-thin glass, whether in sheet form or web form disposed in a roll.

Figures 6, 7:
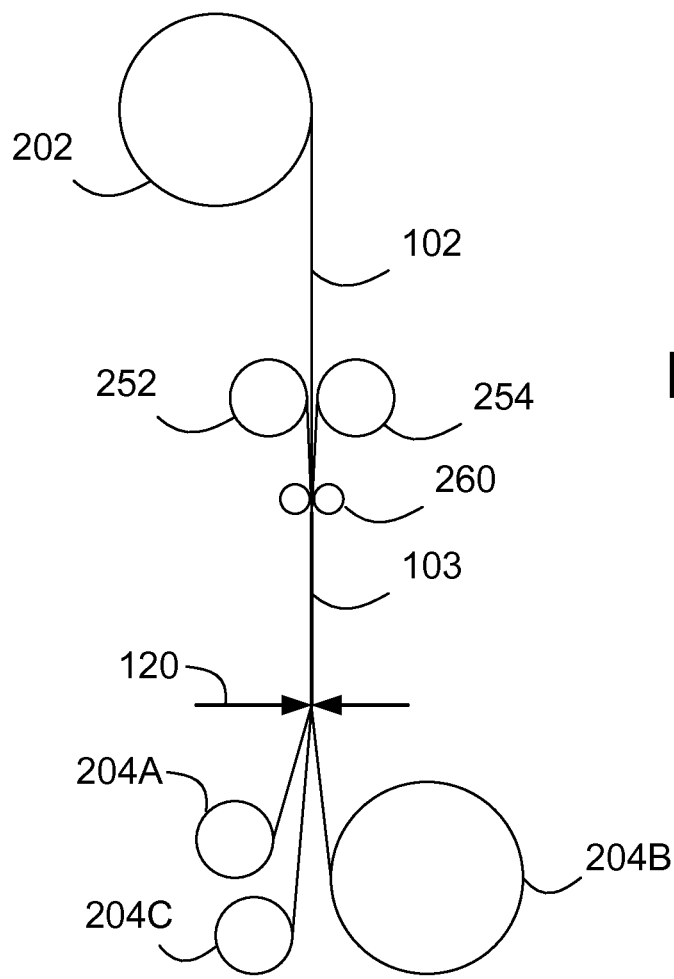
FIG. 6 is a table illustrating suitable component ranges for the glass composition used in producing the laminated structures of the embodiments herein.
FIG. 7 is a schematic illustration of a processing system for producing a web of the laminated structure in a continuous process.

With reference to FIGS. 5A-5B, the compositions of the glass sheets 102 were varied during experimentation to evaluate the effect on the edge characteristics of the structure 100. For example, variations in the mole percentage of $SiO_2$, $Al_2O_3$, $B_2O_3$, MgO, CaO, SrO, BaO, and ZnO were made over nineteen samples. With reference to FIG. 6, acceptable edge characteristics were found when the glass sheet 102 is formed from a composition in mole percent of: 50-80% $SiO_2$, 2-15% $Al_2O_3$, 10-36% $B_2O_3$, 1-15% RO (where RO is one or more of MgO, CaO, SrO, BaO, ZnO), and 0-5% other minor components. While the above compositions were found to be very effective, it is believed that other compositions of glass will also yield satisfactory (although different) results depending on the particular application.

With reference to FIG. 7, the process of adhering the polymer layer 106 to the glass sheet 102 may include lamination directly to at least one of the first and second surfaces of the glass sheet 102 during one of: an up-draw process, a down-draw process, a slot-draw process, a fusion process, a redraw process (e.g., from a spool source, from a sheet source, etc.). The illustrated process is the re-draw process, where a web of the glass sheet 102 material is supplied from a source roll 202 into a furnace and heated to a re-draw temperature. Before presenting the glass sheet 102 to the redraw furnace it may be necessary to remove a temporary static film (which may have been previously applied to the glass sheet 102 as a protective film). Indeed, such temporary film may have been applied from a previous forming process to preserve the pristine glass quality before redraw. An anti-static bar may also be employed at various points in the process to protect the virgin surface of the glass sheet 102. The glass sheet 102 is then carefully stretched to a desired thickness (e.g., less than about 300 microns or other thicknesses as discussed above). One or more sources (e.g., rolls or spools) 252, 254 of polymer film 106 are provided downstream from the stretching zone and apply the polymer layer(s) 106 to the glass sheet 102 (which may be at an elevated temperature due to residual heat from the down-draw glass furnace). A laminator 260 provides additional pressure, heating/cooling, tension, etc. to facilitate the desired adhering of the polymer layer(s) 106 to the glass sheet 102 and produce a web 103 of the laminated structure 100.

The aforementioned cutting step (e.g., via shear cutting, slitting, or the like) may be provided downstream of the lamination zone. A plurality of cutting elements 120 may be provided to produce a number of ribbons of laminated material, which are rolled onto a suitable number of destination spools 204A, 204B, 204C. When the edges of the web 103 are to be discarded, the cutting elements 120 are located nearer to the edges of the web 103, the outer spools 204A, 204C may collect the waste while the spool 204B collects the desired ribbon for later processing.

It is noted that there are any number of alternative ways to apply the polymer layer(s) 106 to the glass sheet 102. For example, the polymer layer 106 may be applied to the glass sheet 102 from a spool, via a die, via a spray technique, etc. The polymer layer 106 may be bonded to the glass sheet via pressure, chemical techniques, thermal techniques, ultraviolet curing techniques, adhesive layers, and/or any combination of the above or other techniques known in the art or developed in the future.

Figure 8:
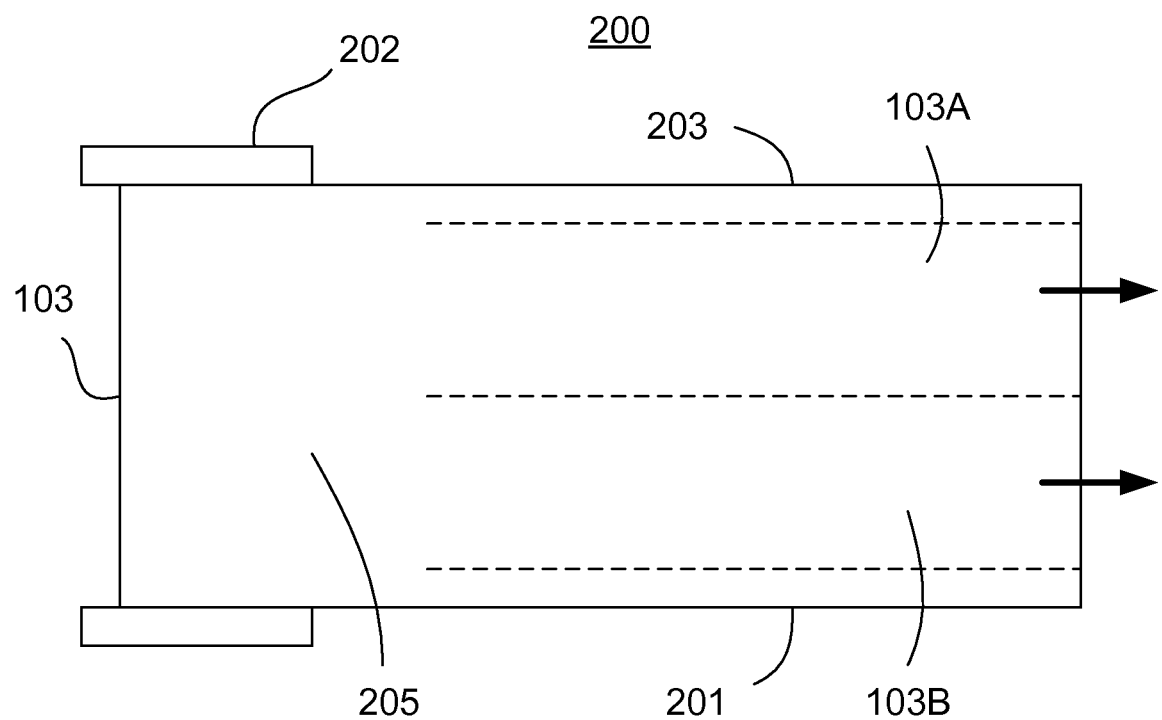
FIG. 8 is top schematic view of an apparatus for cutting a web (e.g., the laminated structure) into at least ribbons in a continuous transport process.

An additional and/or alternative continuous roll-to-roll apparatus 200 for cutting the laminated structure 100 is illustrated in FIGS. 8-9. It is noted that the apparatus 200 may be combined with some of the structure of FIG. 7 to achieve further functionality, although a skilled artisan will see that there are some common, or at least similar, structures in the respective apparatuses of FIG. 7 and FIGS. 8-9. The apparatus 200 operates to cut a web 103 of the laminated structure 100 into at least two ribbons 103A, 103B. Additional cutting may be provided to discard waste near the edges 201, 203 of the web 103. In general, the apparatus 200 operates to source the web 103 and continuously move the web 103 from the source 202 to the destination 204 in a transport direction along the length of the web 103 (illustrated by the arrows). During the transport of the web 103 from the source 202 to the destination 204, the web 103 is cut in a cutting zone 147 into at least first and second ribbons 103A, 103B. The web 103 has a length (in the transport direction) and a width transverse to the length, and the respective widths of the first and second ribbons 103A, 103B will obviously be restrained within the overall width of the web 103.

The web 103 may be provided by a wide range of sources. For example, the web 103 may be provided using the aforementioned re-draw forming apparatus (see FIG. 7) without the destination spool 204, i.e., where the resultant web 103 may be introduced into the transport mechanisms of the apparatus 200 for cutting. Alternatively, the source of web 103 may include a coiled spool 202 as shown, where the web 103 is first wound onto the spool 202, e.g., following the re-draw process as described above with respect to FIG. 7. Typically, the coiled spool 202 would be provided with a diameter to present an acceptable bending stress to accommodate the characteristics of the web 103. Once coiled, the web 103 may be uncoiled from the spool 202 and introduced into the transport mechanisms of the apparatus 200. It is noted that the web 103 would typically include a pair of opposed edge portions 201, 203 and a central portion 205 spanning between the opposed edge portions 201, 203. Due to the re-draw process (or other formation process), the edge portions 201, 203 of the web 103 may have undesirable features, such as beads of a thickness that is typically greater than a thickness of the central portion 205 of the web 103. Such features may be removed using the cutting techniques disclosed herein or other approaches.

The destination 204 of the apparatus may include any suitable mechanisms for accumulating the respective ribbons 103A, 103B. In the example illustrated in FIG. 9, the destination 204 includes first and second spools 204A, 204B, each spool receiving and winding one of the ribbons 103A, 103B. Again, the spools 204A, 204B should be provided with a suitable diameter to present an acceptable bend radius in order to accommodate the characteristics of the respective ribbons 103A, 103B.

The apparatus 200 includes a transport mechanism having a number of individual elements that cooperate to continuously move the web 103 from the source spool 202 to the destination spools 204 in the transport direction. This transport function may be accomplished without degrading the desirable characteristics of the edge portions 201, 203, the produced edges from the cutting operation, or either (pristine) side of the central portion 205 of the web 103. In short, the transport function is accomplished without degrading desirable characteristics of the individual ribbons 103A, 103B.

In particular, the apparatus 200 may include a plurality of noncontact support members 206, 208, rollers, etc., to guide the web 103 and ribbons 103A, 103B through the system from the source spool 202 to the destination spools 204. The non-contact support members 206, 208 may be flat and/or curved in order to achieve desirable directional conveyance of the respective work pieces. Each of the noncontact support members 206, 208 may include a fluid bar and/or a low friction surface in order to ensure that the web 103 and ribbons 103A, 103B are suitably conveyed through the system without damage or contamination. When a given non-contact support member 206, 208 includes an fluid bar, such element includes a plurality of passages and ports configured to provide a positive fluid pressure stream (such as air), and/or a plurality of passages and ports configured to provide a negative fluid pressure stream, to the associated surface of the web 103 and/or ribbons 103A, 103B in order to create an air cushion for such noncontact support. A combination of positive and negative fluid pressure streams may stabilize the web 103 and ribbons 103A, 103B during transport through the system.

Optionally, a number of lateral guides (not shown) may be employed proximate to the edge portions 201, 203 of the web 103 and/or ribbons 103A, 103B to assist in orienting the web 103 in a desired lateral position relative to the transport direction. For example, the lateral guides may be implemented using rollers configured to engage a corresponding one of the opposed edge portions 201, 203 of the web 103, and/or one or more edge portions of the ribbons 103A, 103B. Corresponding forces applied to the edge portions 201, 203 by the corresponding lateral guides may shift and align the web 103 in the proper lateral orientation as the web 103 is conveyed through the apparatus.

The apparatus 200 further includes a cutting mechanism 120 that operates to cut or sever the web 103 in the cutting zone 147 as the web 103 passes over, for example, the noncontact support member 208. The cutting mechanism 120 may make a single cut or simultaneous multiple cuts. Notably, however, the cutting mechanism 120 need not be a laser system to achieve desirable edge characteristics. Instead, the cutting mechanisms may be of the less complex, less costly types discussed above, such as the shear cutting, burst cutting, razor cutting, crush cutting, score cutting, slitter, etc.

In accordance with one or more further embodiments, one or more of the aforementioned cutting techniques (such as shear cutting) may be combined with a scoring (or scribing) operation to achieve desirable results. As discussed above, when the laminate structure 100 is cut, lateral cracks will initiate at the cut edge and propagate into the glass sheet 102 (see FIGS. 3-4). It has been found that some control over the depth of propagation of such cracks may be obtained using a scribing technique. In particular, a scribing tool, such as a diamond tipped tool, may be used to first scribe or score a trench into the glass sheet 102 parallel to, and slightly spaced away from, an intended cutting line. Once the scribe line (which exhibits trench-like characteristics in the surface of the glass sheet 102) is in place, the cutting operation is carried out to cut along the intended cutting line. Any cracks that propagate from the cut edge toward the scribe line will cease propagation at the scribe line. Indeed, any cracks reaching the scribe line will abruptly change direction due to the trench, where the propagation direction changes from generally transverse to the thickness of the glass sheet 102 to generally parallel to the thickness of the glass sheet 102. Thus, placement of the scribe line relative to the intended cutting line will give the artisan some control over the extent of the micro-cracking, and therefore the quality characteristics of the cut edge.

It has been found that the above-noted scribing technique may be applied successfully to shear cutting with scissor-type mechanisms (although other cutting techniques may also benefit). Notably, when cutting the laminate structure 100 with scissors, cracks will propagate from both cut edges (resulting from a single cut) and into the respective portions of the glass sheet 102. It has been found that such cracks propagate significantly further into one of the portions of the glass sheet 102 as compared with the other, and that such characteristics are highly correlated with the sides of the scissors on which the respective portions of the glass sheet 102 are positioned during the cut. In other words, the mechanical characteristics of the scissors do not result in symmetrical treatment of the respective portions of the glass sheet 102 on either side of a cut; rather, the action of the scissors actually manipulates one of the portions of the glass sheet 102 in such a manner as to cause the cracks to propagate further into such portion as compared to the other. Without limiting the embodiments to any theory of operation, it is believed that the specific mechanism of manipulation at play is that the scissors bend the portion of the glass sheet 102 on one side of the scissors more severely than the other, thus resulting in more cracks in the portion of glass sheet 102 on one side than the other. Placement of a scribe line on one side of the intended cut line (i.e., on a side of the intended cut line that corresponds to the side of the scissors that tends to bend the glass sheet 102 more severely) will mitigate the propagation of cracks on such side.

The above scribing technique may be applied to only one side of an intended cut line or it may be applied to both sides of an intended cut line, all depending on the exigencies of the particular application. The resulting edge of a laminated structure 100 that has been cut using a scribe line will include the cut edge at the extreme, an intermediate zone inward from the cut edge containing cracks running from the cut edge toward the scribe line, and a bulk zone inward from the scribe line containing substantially no cracks from the cutting operation. The resulting structure may be used in such state or may be further processed, for example, by removing the polymer layer 106 in the intermediate zone and removing the portion of the glass sheet 102 of the intermediate zone (which contains the cracks). The removal of the portion of the glass sheet 102 in the intermediate zone may include snapping such portion off or otherwise providing mechanical emphasis to cause such portion to fall away from the structure 100. Such manipulation would result in a new edge at the scribe line of the structure 100.

In accordance with an alternative approach, the scribe technique could be applied to the laminated structure 100 without using a subsequent cutting technique. Indeed, the scribing tool may be used to score through the polymer layer 106 and into the glass sheet 102 thereunder along an intended line of separation. Instead of using a further cutting technique (such as shearing), however, the structure 100 would be snapped along such scribe line (i.e., along the intended line of separation) to achieve the desired cut edge.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

The invention claimed is:

1. A method, comprising:
sourcing an ultra-thin glass sheet having first and second opposing major surfaces and perimeter edges therebetween, the glass sheet having a thickness between the first and second surfaces of less than about 300 microns;
adhering at least one polymer layer directly or indirectly to at least one of the first and second surfaces of the glass sheet to form a laminated structure, wherein a thickness of the at least one polymer layer is between about 3-10 mils;
and
cutting the laminated structure using at least one of the following techniques: shear cutting, burst cutting, slit cutting, and crush cutting,
wherein the cutting step produces at least one cut edge having an edge characteristic in which a plurality of lateral cracks run from the cut edge into the glass sheet, and wherein the plurality of cracks penetrate no further than about 600 microns.

2. The method of claim 1, wherein the at least one polymer layer is formed from at least one of: (i) polypropylene (PP) and/or propylene co-polymers; (ii) polyethylene terephthalate (PET); (iii) ethylene vinyl acetate (EVA); (iv) ethylene tetrafluoroethylene (ETFE); (v) cellulose acetate polymers (CA), including cellulose triacetate (TAC); (vi) poly methyl methacrylate (PMMA); (vii) polyethylene and/or polyethylene copolymers (PE); (viii) polyvinylchloride (PVC); (ix) polycarbonate (PC); (x) acrylic polymers (ACRYL); and (xi) nylon polymers.

3. The method of claim 1, wherein the glass sheet is formed from a composition in mole percent of: 50-80% $SiO_2$, 2-15% $Al_2O_3$, 10-36% $B_2O_3$, 1-15% RO (where RO is one or more of MgO, CaO, SrO, BaO, ZnO), and 0-5% other minor components.

4. The method of claim 1, wherein the adhering step includes lamination of the at least one polymer layer directly to at least one of the first and second surfaces of the glass sheet.

5. The method of claim 4, wherein the lamination of the at least one polymer layer directly to at least one of the first and second surfaces of the glass sheet is carried out at temperature during one of: an up-draw process, a down-draw process, a fusion process, a redraw process, and a slot-draw process.

6. The method of claim 1, wherein the adhering step includes laminating the at least one polymer layer indirectly to at least one of the first and second surfaces of the glass sheet through one or more intermediate adhesive layers.

7. The method of claim 1, wherein the adhering step includes laminating a first one or more polymer layers to the first surface of the glass sheet, and laminating a second one or more polymer layers to the second surface of the glass sheet.

8. The method of claim 1, wherein the adhering step includes laminating one or more polymer layers to at least one of the edges of the glass sheet.

9. The method of claim 1, further comprising:
providing a web of the laminated structure;
continuously moving the web to a destination roll in a transport direction along a length of the web; and
continuously cutting the web at one or more cutting zones using one or more of the listed cutting techniques into one or more ribbons as the web is moved to the destination roll.

10. The method of claim 9, wherein the providing step includes:
providing a web of the glass sheet on a source roll;
continuously moving the web from the source roll to the destination roll in a transport direction along a length of the web; and
continuously laminating the at least one polymer layer directly or indirectly to the first and second surfaces of the web as the web moves toward the destination roll.

11. The method of claim 1, further comprising, prior to the cutting step, applying a removable backer layer directly or indirectly to at least one of first and second major surfaces of the laminated structure.

12. The method of claim 11, further comprising applying the removable backer layer indirectly to at least one of the first and second major surfaces of the laminated structure through one or more intermediate adhesive layers.

13. The method of claim 1, wherein the laminated structure exhibits a water vapor transmission rate of less than 10-6 g·mm/m²·day.

\* \* \* \* \*